US009575519B2

(12) United States Patent
Yin et al.

(10) Patent No.: US 9,575,519 B2
(45) Date of Patent: Feb. 21, 2017

(54) STORAGE EXPANSION SYSTEM

(71) Applicant: Shenzhen Treasure City Technology Co., LTD., Shenzhen (CN)

(72) Inventors: Xiao-Gang Yin, Shenzhen (CN); Jun-Hui Wang, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 351 days.

(21) Appl. No.: 14/064,555

(22) Filed: Oct. 28, 2013

(65) Prior Publication Data

US 2015/0062797 A1 Mar. 5, 2015

(30) Foreign Application Priority Data

Aug. 28, 2013 (CN) .......................... 2013 1 0380716

(51) Int. Cl.
*G06F 1/18* (2006.01)

(52) U.S. Cl.
CPC .................................... *G06F 1/185* (2013.01)

(58) Field of Classification Search
CPC .................................. G06F 1/18; G06F 1/185
USPC .................................. 361/679.32, 748, 785
See application file for complete search history.

(56) References Cited

U.S. PATENT DOCUMENTS 6,692,293 B2 * 2/2004 MacLaren .............. H01R 13/64 439/489
2006/0245119 A1 * 11/2006 Goodwin ................. G11C 5/04 361/1
2007/0152768 A1 * 7/2007 Mellitz ................ H05K 1/0224 333/1
2014/0233192 A1 * 8/2014 Hsu ......................... G06F 1/185 361/737
2014/0321044 A1 * 10/2014 Liu ......................... G06F 1/185 361/679.32

* cited by examiner

*Primary Examiner* — Dion R Ferguson
*Assistant Examiner* — Mandeep S Buttar
(74) *Attorney, Agent, or Firm* — Zhigang Ma

(57) ABSTRACT

A storage expansion system includes an expansion apparatus and a serial advanced technology attachment dual in-line memory module (SATA DIMM) device. A memory slot, a SATA port, a SATA signal expansion member, and a voltage converter are arranged on the expansion apparatus. The memory slot includes first power pins, first ground pins, and first signal pins connected to the SATA signal expansion member. A first edge connector is arranged on a side of the expansion apparatus. The first edge connector includes second power pins and second ground pins. The first and second power pins are connected to the voltage converter. A second edge connector is arranged on a bottom side of the SATA DIMM device. The second edge connector includes third power pins connected to a control chip and storage chips, third ground pins, and second signal pins connected to the control chip.

10 Claims, 2 Drawing Sheets

10
15
17
12
11
110
100
12
163
162
161
16
14
22
24
223
222
25
20
221
200
250
262
21
27
261
26
23
28

STORAGE EXPANSION SYSTEM

BACKGROUND

1. Technical Field

The present disclosure relates to a storage expansion system.

2. Description of Related Art

Solid state drives (SSD) store data on chips instead of on magnetic or optical discs and are used for adding storage capacity. One type of SSD has the form factor of a DIMM device and is called a serial advanced technology attachment (SATA) DIMM device. The SATA DIMM device can be inserted into a memory slot of a motherboard to receive voltages from the motherboard through the memory slot and receive hard disk drive (HDD) signals through SATA connectors of the SATA DIMM module connected to a SATA connector on the motherboard. However, the number of memory slots and SATA connectors of the motherboard is limited, thus the motherboard can only receive a limited quantity of SATA DIMM devices. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean "at least one."

Figure 1:
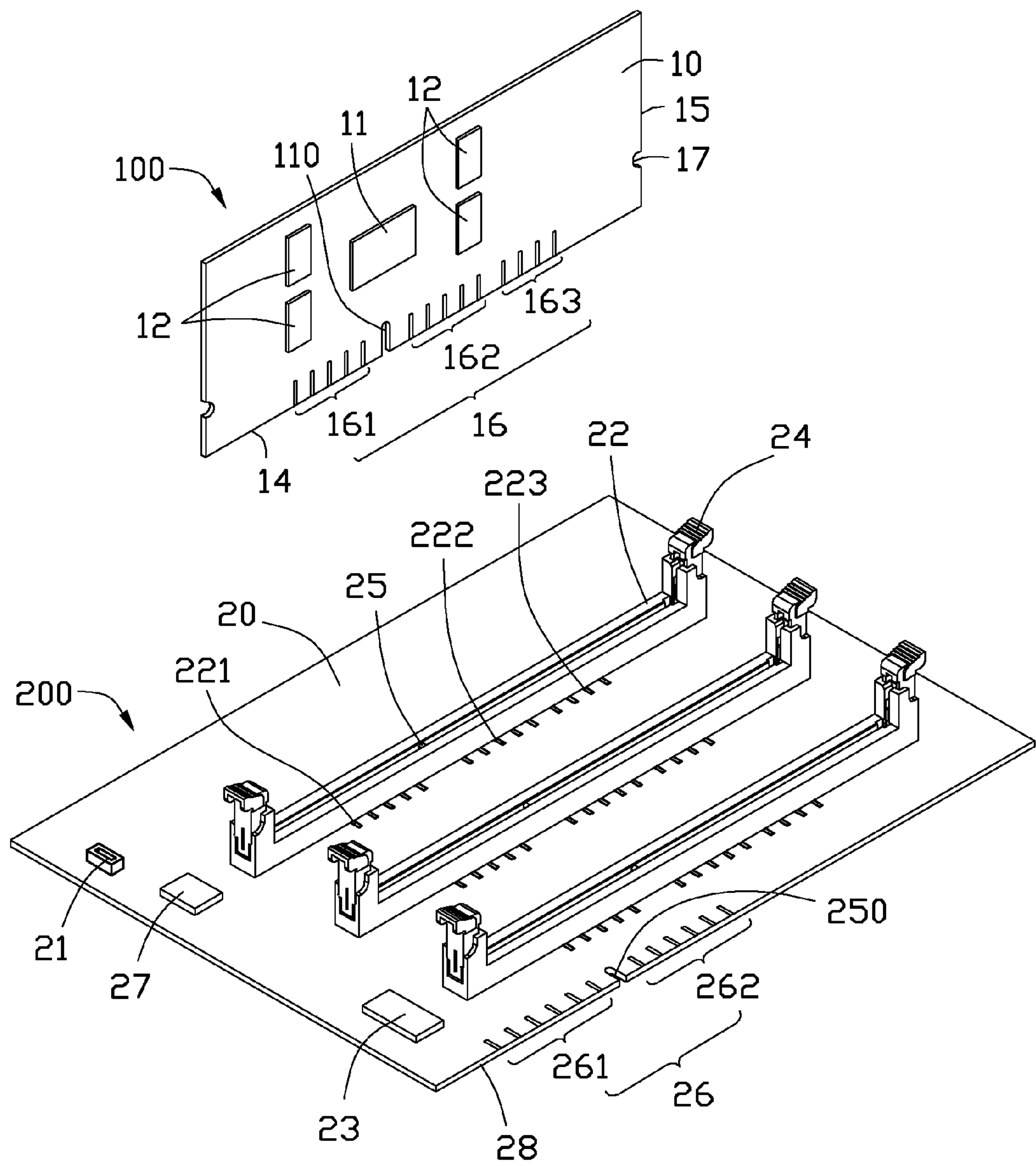
FIG. 1 is an exploded, isometric view of a storage expansion system in accordance with an embodiment of the present disclosure.
Figure 2:
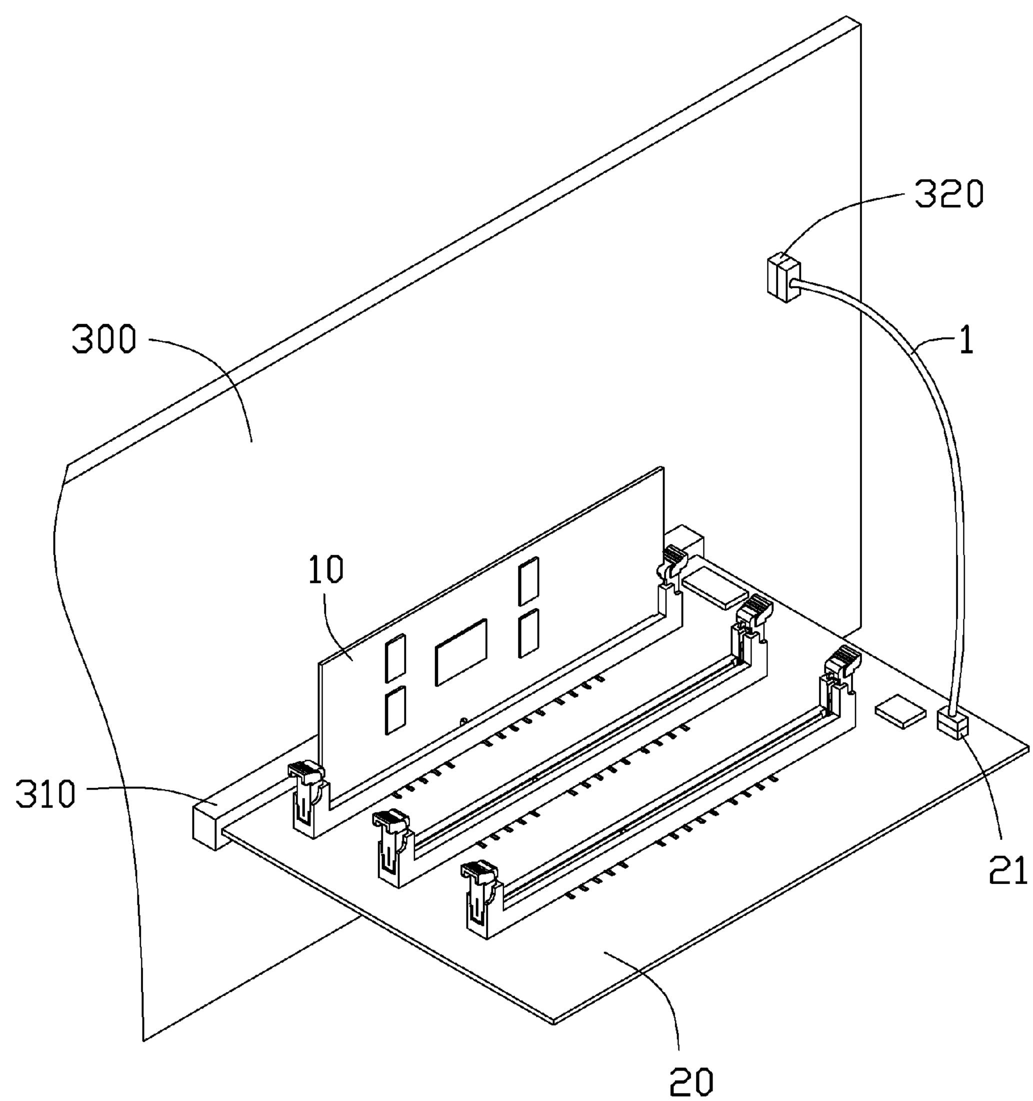
FIG. 2 is an assembled, isometric view of the storage expansion system of FIG. 1 connected to a motherboard.

FIGS. 1 and 2 show a storage expansion system in accordance with an embodiment including a serial advanced technology attachment dual in-line memory module (SATA DIMM) device 100 and an expansion apparatus 200 for supporting the SATA DIMM device 100. The SATA DIMM device 100 includes a substantially rectangular circuit board 10. A control chip 11 and a plurality of storage chips 12 connected to the control chip 11 are all arranged on the circuit board 10. An edge connector 16 is arranged along a bottom side 14 of the circuit board 10. The edge connector 16 includes a plurality of power pins 161, a plurality of ground pins 162, and four signal pins 163. The signal pins 163 include a pair of signal input pins and a pair of signal output pins. The power pins 161 are connected to the control chip 11 and the storage chips 12. The signal pins 163 are connected to the control chip 11. The ground pins 162 are connected to a ground layer (not shown) of the circuit board 10. A notch 110 is defined in the bottom side 14 of the circuit board 10 and located between the power pins 161 and the ground pins 162. The circuit board 10 defines two grooves 17 in two opposite ends 15.

The expansion apparatus 200 includes a substantially rectangular circuit board 20. A plurality of memory slots 22, such as double data rate type two (DDR2) or double data rate type three (DDR3), a voltage converter 23, a SATA port 21, and a SATA signal expansion member 27 connected to the SATA port 21 are all arranged on the circuit board 20. Each memory slot 22 is used to receive a SATA DIMM device 100. Two fixing elements 24 are arranged on two ends of each memory slot 22. The memory slot 22 includes a protrusion 25, a plurality of power pins 221, a plurality of ground pins 222, and four signal pins 223. The signal pins 223 include a pair of signal input pins and a pair of signal output pins. The power pins 221 are connected to the voltage converter 23. The signal pins 223 are connected to the SATA signal expansion member 27. The ground pins 222 are connected to a ground layer (not shown) of the circuit board 20. In one embodiment, there are three memory slots 22. In other embodiments, the number of the memory slots 22 can be changed as needed. The SATA port 21 may be a serial attached small computer system interface (SAS) port. The SATA signal expansion member 27 may be a SAS signal expansion member. A notch 250 and an edge connector 26 are both arranged on a side 28 of the circuit board 20. The edge connector 26 includes a plurality of power pins 261 and a plurality of ground pins 262. The power pins 261 are connected to the voltage converter 23. The ground pins 262 are connected to the ground layer of the circuit board 20. In one embodiment, the edge connector 26 is in accordance with a peripheral component interconnection express (PCIe) X1 standard.

In use, the edge connector 16 is inserted into one of the memory slots 22, and the protrusion 25 is engaged in the notch 110. The power pins 161, the ground pins 162, and the signal pins 163 of the edge connector 16 are electrically connected to the power pins 221, the ground pins 222, and the signal pins 223 of the memory slot 22, respectively. The fixing elements 24 of the memory slot 22 are engaged in the grooves 17 of the SATA DIMM device 100 to secure the SATA DIMM device 100 to the memory slot 22. The edge connector 26 is then inserted into an expansion slot, such as a PCIe slot 310 of a motherboard 300. The SATA port 21 is connected to a SATA port 320 of the motherboard 300 by a cable 1 with two SATA ports. In other embodiments, the expansion apparatus 200 with the SATA DIMM device 100 can be inserted into an expansion slot of an adapter card, and then the adapter card can be inserted into the PCIe slot 310 of the motherboard 300, to satisfy a space requirement.

When the motherboard 300 receives power, the motherboard 300 outputs a voltage to the voltage converter 23 through the PCIe slot 310 and the power pins 261. The voltage converter 23 converts the received voltage and provides the converted voltage to the control chip 11 and the storage chips 12 through the power pins 221 and 161. At the same time, the motherboard 300 outputs a hard disk drive (HDD) control signal, such as a SATA signal to the SATA signal expansion member 27 through the SATA ports 320 and 21. The SATA signal expansion member 27 expands the received SATA signal to a plurality of SATA signals and provides the SATA signals to the control chip 11 through the signal pins 223 of the corresponding memory slot 22 and the signal pins 163. The control chip 11 controls the storage chips 12 to read or write data according to the received HDD control signal. The other memory slots 22 receive the other SATA DIMM devices 100 in the same way as mentioned above.

The expansion apparatus 200 receives a voltage and an HDD control signal from the motherboard 300 and transmits the voltage and the HDD control signal to the plurality of SATA DIMM devices 100, to expand the storage capacity of the motherboard 300. The storage expansion system can conveniently expand storage capacity by connecting a plurality of SATA DIMM devices 100 to the plurality of memory slots 22 of the expansion apparatus 200, to avoid using the memory slots and the SATA ports arranged on the motherboard 300 and these memory slots and SATA ports can be used for other purposes.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A storage expansion system comprising:

an expansion apparatus comprising a first circuit board, a plurality of memory slots mounted on the first circuit board, a first serial advanced technology attachment (SATA) port connected to a second SATA port of a motherboard, a SATA signal expansion member mounted on the first circuit board and connected to the first SATA port, and a voltage converter mounted on the first circuit board, each of the plurality of memory slots comprising a protrusion, a plurality of first power pins electrically connected to the voltage converter, a plurality of first ground pins grounded, and four first signal pins connected to the SATA signal expansion member, a first notch and a first edge connector arranged on a side of the first circuit board, to be inserted into an expansion slot of the motherboard, the first edge connector being in accordance with peripheral component interconnection express (PCIe) X1 standard and comprising a plurality of second power pins connected to the voltage converter and a plurality of second ground pins grounded; and a SATA dual in-line memory module (DIMM) device comprising a second circuit board, a control chip arranged on the second circuit board, a plurality of storage chips arranged on the second circuit board and connected to the control chip, and a second edge connector and a second notch arranged on a bottom side of the second circuit board to be detachably engaged in one of the plurality of memory slots, the second edge connector comprising a plurality of third power pins connected to the control chip and the plurality of storage chips, a plurality of third ground pins grounded, and four second signal pins connected to the control chip;

wherein in response to the second edge connector of the SATA DIMM device being engaged in one of the plurality of memory slots of the expansion apparatus, the protrusion is engaged in the second notch, the plurality of first power pins of the memory slot is connected to the plurality of third power pins of the SATA DIMM device, the plurality of first ground pins of the memory slot is connected to the plurality of third ground pins of the SATA DIMM device, and the four first signal pins of the memory slot are connected to the four second signal pins of the SATA DIMM device; the first signal pins of the memory slot comprise a pair of signal input pins and a pair of signal output pins, the second signal pins of the SATA DIMM device comprise a pair of signal input pins and a pair of signal output pins.

2. The storage expansion system of claim 1, wherein two opposite ends of the second circuit board define two grooves, the memory slot of the first circuit board form two fixing elements to engage in the grooves of the second circuit board.

3. The storage expansion system of claim 1, wherein the plurality of memory slots is double data rate type two memory slots.

4. The storage expansion system of claim 1, wherein the plurality of memory slots is double data rate type three memory slots.

5. A storage expansion system comprising:

an expansion apparatus comprising a first circuit board, a plurality of memory slots mounted on the first circuit board, a first serial advanced technology attachment (SATA) port connected to a second SATA port of a motherboard, a SATA signal expansion member mounted on the first circuit board and connected to the first SATA port, and a voltage converter mounted on the first circuit board, each of the plurality of memory slots comprising a protrusion, a plurality of first power pins electrically connected to the voltage converter, a plurality of first ground pins grounded, and four first signal pins connected to the SATA signal expansion member, a first notch and a first edge connector arranged on a side of the first circuit board, to be inserted into an expansion slot of the motherboard, the first edge connector being in accordance with peripheral component interconnection express (PCIe) X1 standard and comprising a plurality of second power pins connected to the voltage converter and a plurality of second ground pins grounded; and a SATA dual in-line memory module (DIMM) device comprising a second circuit board, a control chip arranged on the second circuit board, a plurality of storage chips arranged on the second circuit board and connected to the control chip, and a second edge connector and a second notch arranged on a bottom side of the second circuit board to be detachably engaged in one of the plurality of memory slots, the second edge connector comprising a plurality of third power pins connected to the control chip and the plurality of storage chips, a plurality of third ground pins grounded, and four second signal pins connected to the control chip;

wherein in response to the second edge connector of the SATA DIMM device being engaged in one of the plurality of memory slots of the expansion apparatus, the protrusion is engaged in the second notch, the plurality of first power pins of the memory slot is connected to the plurality of third power pins of the SATA DIMM device, the plurality of first ground pins of the memory slot is connected to the plurality of third ground pins of the SATA DIMM device, and the four first signal pins of the memory slot are connected to the four second signal pins of the SATA DIMM device; two opposite ends of the second circuit board defining two grooves, the memory slot of the first circuit board forming two fixing elements to engage in the grooves of the second circuit board.

6. The storage expansion system of claim 5, wherein the plurality of memory slots is double data rate type two memory slots.

7. The storage expansion system of claim 6, wherein the first signal pins of the memory slot comprise a pair of signal input pins and a pair of signal output pins, the second signal pins of the SATA DIMM device comprise a pair of signal input pins and a pair of signal output pins.

8. The storage expansion system of claim 5, wherein the plurality of memory slots is double data rate type three memory slots.

9. The storage expansion system of claim 8, wherein the first signal pins of the memory slot comprise a pair of signal input pins and a pair of signal output pins, the second signal pins of the SATA DIMM device comprise a pair of signal input pins and a pair of signal output pins.

10. A storage expansion system comprising:

an expansion apparatus comprising a first circuit board, a plurality of memory slots mounted on the first circuit board, a first serial advanced technology attachment (SATA) port connected to a second SATA port of a motherboard, a SATA signal expansion member mounted on the first circuit board and connected to the first SATA port, and a voltage converter mounted on the first circuit board, each of the plurality of memory slots comprising a protrusion, a plurality of first power pins electrically connected to the voltage converter, a plurality of first ground pins grounded, and four first signal pins connected to the SATA signal expansion member, a first notch and a first edge connector arranged on a side of the first circuit board, to be inserted into an expansion slot of the motherboard, the first edge connector being in accordance with peripheral component interconnection express (PCIe) X1 standard and comprising a plurality of second power pins connected to the voltage converter and a plurality of second ground pins grounded; and a SATA dual in-line memory module (DIMM) device comprising a second circuit board, a control chip arranged on the second circuit board, a plurality of storage chips arranged on the second circuit board and connected to the control chip, and a second edge connector and a second notch arranged on a bottom side of the second circuit board to be detachably engaged in one of the plurality of memory slots, the second edge connector comprising a plurality of third power pins connected to the control chip and the plurality of storage chips, a plurality of third ground pins grounded, and four second signal pins connected to the control chip;

wherein in response to the second edge connector of the SATA DIMM device being engaged in one of the plurality of memory slots of the expansion apparatus, the protrusion is engaged in the second notch, the plurality of first power pins of the memory slot is connected to the plurality of third power pins of the SATA DIMM device, the plurality of first ground pins of the memory slot is connected to the plurality of third ground pins of the SATA DIMM device, and the four first signal pins of the memory slot are connected to the four second signal pins of the SATA DIMM device; the plurality of memory slots being double data rate type two memory slots or double data rate type three memory slots.

* * * * *